US010202865B2

(12) United States Patent
Breeze-Stringfellow et al.

(10) Patent No.: US 10,202,865 B2
(45) Date of Patent: Feb. 12, 2019

(54) UNDUCTED THRUST PRODUCING SYSTEM

(71) Applicant: General Electric Company, Schenectady, NY (US)

(72) Inventors: Andrew Breeze-Stringfellow, Cincinnati, OH (US); Syed Arif Khalid, West Chester, OH (US); Leroy Harrington Smith, Jr., Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 339 days.

(21) Appl. No.: 14/437,872

(22) PCT Filed: Oct. 23, 2013

(86) PCT No.: PCT/US2013/066383
§ 371 (c)(1),
(2) Date: Apr. 23, 2015

(87) PCT Pub. No.: WO2014/066503
PCT Pub. Date: May 1, 2014

(65) Prior Publication Data
US 2015/0284070 A1    Oct. 8, 2015

Related U.S. Application Data

(60) Provisional application No. 61/717,445, filed on Oct. 23, 2012, provisional application No. 61/717,451, (Continued)

(51) Int. Cl.
*F01D 17/16* (2006.01)
*B64C 11/18* (2006.01)
(Continued)

(52) U.S. Cl.
CPC ............. *F01D 17/16* (2013.01); *B64C 11/001* (2013.01); *B64C 11/18* (2013.01); *B64C 11/46* (2013.01);
(Continued)

(58) Field of Classification Search
CPC ......... F01D 9/06; F01D 17/16; B64C 11/001; B64C 11/18; B64C 11/46; B64C 11/48;
(Continued)

(56) References Cited

U.S. PATENT DOCUMENTS 2,999,630 A    9/1961  Warren et al.
3,972,646 A *  8/1976  Brown .................... B63H 1/18
                                                    416/228
(Continued)

FOREIGN PATENT DOCUMENTS

CN    1204005 A      1/1999
CN    101657607 A    2/2010
(Continued)

OTHER PUBLICATIONS

U.S. Appl. No. 14/438,006, filed Apr. 23, 2015, Darek Tomasz Zatorski.
(Continued)

*Primary Examiner* — David E Sosnowski
*Assistant Examiner* — Sang K Kim
(74) *Attorney, Agent, or Firm* — General Electric Company; Brian Overbeck

(57) ABSTRACT

An unducted thrust producing system has a rotating element with an axis of rotation and a stationary element. The rotating element includes a plurality of blades each having a blade root proximal to the axis, a blade tip remote from the axis, and a blade span measured between the blade root and the blade tip. The rotating element has a load distribution such that at any location between the blade root and 30%
(Continued)

span the value of ΔRCu in the air stream is greater than or equal to 60% of the peak ΔRCu in the air stream.

24 Claims, 19 Drawing Sheets

Related U.S. Application Data filed on Oct. 23, 2012, provisional application No. 61/771,314, filed on Mar. 1, 2013.

(51) Int. Cl.

| | | |
|---|---|---|
| *B64C 11/46* | (2006.01) | |
| *F02K 3/02* | (2006.01) | |
| *F02C 6/20* | (2006.01) | |
| *F02K 1/46* | (2006.01) | |
| *B64C 11/00* | (2006.01) | |
| *B64C 11/48* | (2006.01) | |
| *F01D 9/02* | (2006.01) | |

(52) U.S. Cl.
CPC ............... *B64C 11/48* (2013.01); *F01D 9/02* (2013.01); *F02C 6/206* (2013.01); *F02K 1/46* (2013.01); *F02K 3/025* (2013.01); *F05B 2240/12* (2013.01); *F05B 2260/96* (2013.01); *F05D 2220/324* (2013.01); *F05D 2220/325* (2013.01); *F05D 2250/30* (2013.01); *F05D 2250/51* (2013.01); *F05D 2250/52* (2013.01); *F05D 2260/14* (2013.01); *Y02E 10/721* (2013.01); *Y02T 50/66* (2013.01); *Y02T 50/671* (2013.01)

(58) Field of Classification Search
CPC .. F02C 6/206; F02K 1/46; F02K 3/025; F05B 2240/12; F05B 2260/96; F05D 2220/324; F05D 2220/325; F05D 2250/30; F05D 2250/51; F05D 2250/52; F05D 2260/14; Y02E 10/721; Y02T 50/66; Y02T 50/671
See application file for complete search history.

(56) References Cited

U.S. PATENT DOCUMENTS

| | | | |
|---|---|---|---|
| 4,486,146 A | 12/1984 | Campion | |
| 4,569,199 A | 2/1986 | Klees et al. | |
| 4,607,657 A | 8/1986 | Hirschkron | |
| 4,784,575 A * | 11/1988 | Nelson ................. | B64C 11/18 416/144 |
| 4,907,946 A | 3/1990 | Ciokajlo et al. | |
| 5,054,998 A * | 10/1991 | Davenport ............ | B64C 11/48 244/110 B |
| 5,190,441 A * | 3/1993 | Murphy ................ | B64C 11/008 415/119 |
| 5,259,187 A | 11/1993 | Dunbar et al. | |
| 5,345,760 A | 9/1994 | Giffin, III | |
| 5,457,346 A | 10/1995 | Blumberg et al. | |
| 5,950,308 A | 9/1999 | Koff et al. | |
| 6,547,518 B1 | 4/2003 | Czachor et al. | |
| 6,792,758 B2 | 9/2004 | Dowman | |
| 7,047,167 B2 * | 5/2006 | Yamaguchi .......... | F01D 5/141 703/2 |
| 7,762,766 B2 | 7/2010 | Shteyman et al. | |
| 8,221,081 B2 * | 7/2012 | Lebrun ................. | B64C 11/18 416/129 |
| 8,382,430 B2 | 2/2013 | Parry et al. | |
| 8,459,035 B2 | 6/2013 | Smith et al. | |
| 8,762,766 B2 | 6/2014 | Ferguson et al. | |
| 9,593,582 B2 * | 3/2017 | Dejeu ................... | B64C 11/18 |
| 2004/0197187 A1 | 10/2004 | Usab et al. | |
| 2004/0234372 A1 | 11/2004 | Shahpar | |
| 2010/0111674 A1 | 5/2010 | Sparks | |
| 2011/0044796 A1 * | 2/2011 | Hussain ................ | B64C 11/18 415/115 |
| 2011/0150659 A1 | 6/2011 | Micheli et al. | |
| 2011/0192166 A1 | 8/2011 | Mulcaire | |
| 2012/0177493 A1 | 7/2012 | Fabre | |
| 2013/0104522 A1 | 5/2013 | Kupratis | |
| 2015/0098813 A1 | 4/2015 | Jarrett, Jr. et al. | |

FOREIGN PATENT DOCUMENTS

| | | |
|---|---|---|
| DE | 102009038076 A1 | 2/2011 |
| EP | 0385913 A1 | 9/1990 |
| EP | 0887259 A2 | 12/1998 |
| EP | 1493900 A2 | 1/2005 |
| EP | 2562082 A2 | 2/2013 |
| EP | 3093443 A1 | 11/2016 |
| GB | 2196390 A | 4/1988 |
| GB | 2461811 A | 1/2010 |
| KR | 101179277 B1 | 9/2012 |
| WO | 2004033295 A1 | 4/2004 |
| WO | 20050111413 A1 | 11/2005 |
| WO | 2011020458 A2 | 2/2011 |
| WO | 2011094477 A2 | 8/2011 |
| WO | 2011107320 A1 | 9/2011 |
| WO | WO2003/029644 A1 * | 4/2013 |

OTHER PUBLICATIONS

U.S. Appl. No. 14/771,975, filed Sep. 1, 2015, Andrew Breeze-Stringfellow et al.
Canadian Office Action issued in connection with related CA Application No. 2887262 dated Feb. 2, 2017.
European Office Action issued in connection with related EP Application No. 16192167.1 dated Feb. 9, 2017.
Unofficial English Translation of Chinese Office Action issued in connection with related CN Application No. 201380055512.1 dated Jan. 12, 2016.
International Search Report issued in connection with corresponding PCT application PCT/US2013/066383 dated Apr. 15, 2014.
Theodorsen, "The Theory of Propellers", NACA (National Advisory Committee for Aeronautics), pp. 1-53, 1944.
Crigler, "Application of Theodorsen's Theory to Propeller Design", NACA (National Advisory Committee for Aeronautics) Rep. 924, pp. 83-99, 1948.
Smith, "Unducted Fan Aerodynamic Design", Turbomachinery, vol. No. 109, Issue No. 03, pp. 313-324, 1987.
Yamamoto et al., "Numerical Calculation of Propfan/Swirl Recovery Vane Flow Field", 28th Joint Propulsion conference and Exhibit, pp. 1-8, Jul. 6-8, 1992.
PCT Search Report and Written Opinion issued in connection with related PCT Application No. PCT/US2013/066403 dated Feb. 25, 2014.
PCT Search Report and Written Opinion issued in connection with related PCT Application No. PCT/US2013/066392 dated Jun. 4, 2014.
Canadian Office Action issued in connection with related CA Application No. 2887262 dated Mar. 11, 2016.
Craig, M.K., et al., Engine architecture with reverse rotation integral drive and vaneless turbine, GE Co-Pending U.S. Appl. No. 61/754,086, filed Jan. 18, 2013.
Non-Final Rejection towards related U.S. Appl. No. 14/438,006 dated Jul. 25, 2017.
U.S. Appl. No. 14/877,210, filed Oct. 7, 2015, Miller, et al.
U.S. Appl. No. 14/438,006, filed Apr. 23, 3026, Zatorski, et al.
U.S. Appl. No. 14/771,975, filed Sep. 1, 2015, Stringfellow, et al.

* cited by examiner

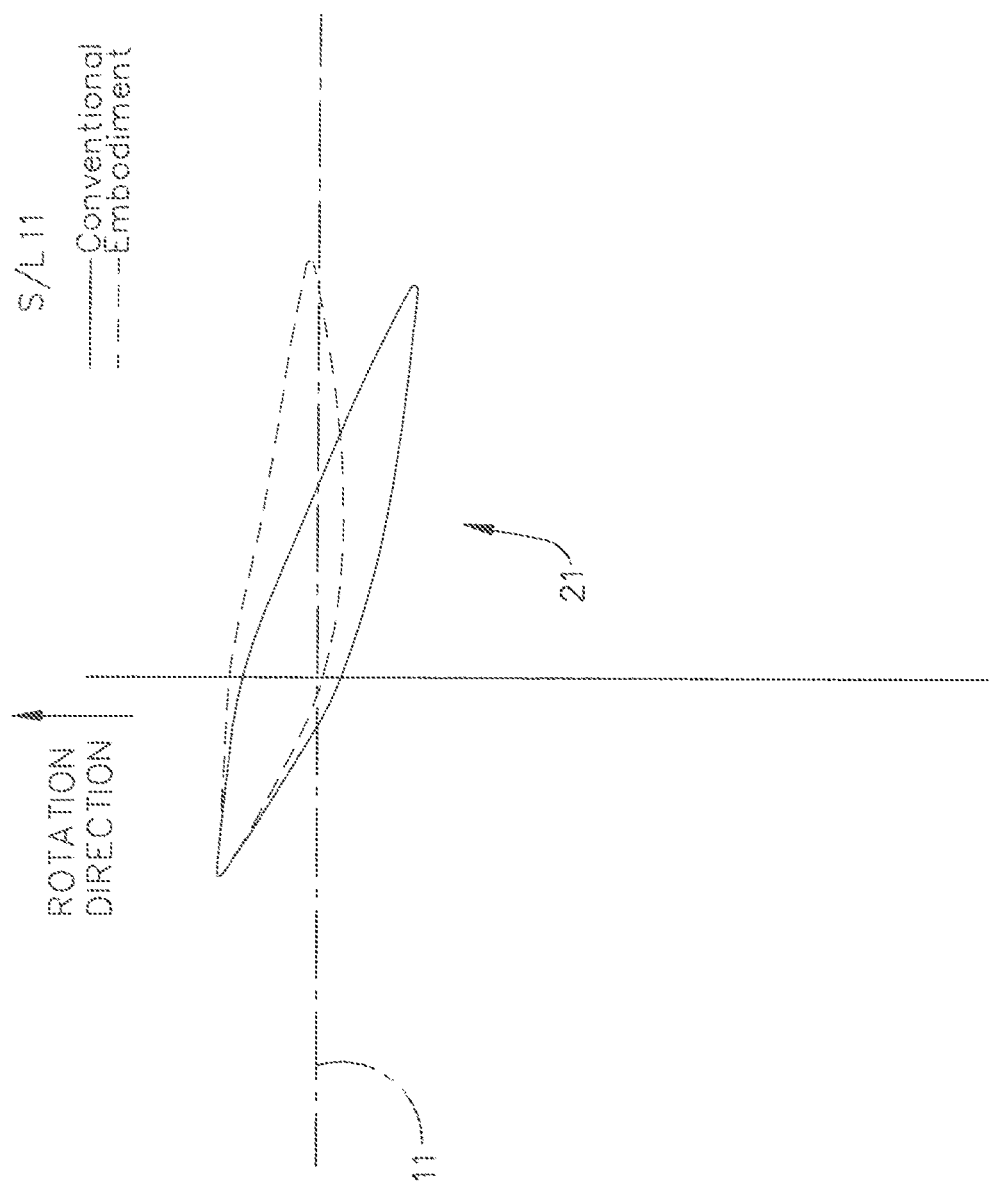

UNDUCTED THRUST PRODUCING SYSTEM

CROSS-REFERENCE TO RELATED APPLICATIONS

This is a national stage application under 35 U.S.C. § 371(c) of prior-filed, co-pending, PCT application serial number PCT/US2013/066383, filed on Oct. 23, 2013, which claims priority to Provisional Patent Application Ser. No. 61/717,451 filed Oct. 23, 2012 and titled "PROPELLER AERODYNAMIC LOADING DISTRIBUTION", and is related to PCT application serial number PCT/US2013/066392, titled "UNDUCTED THRUST PRODUCING SYSTEM ARCHITECTURE" filed on Oct. 23, 2013, and PCT application serial number PCT/US2013/066403, titled "VANE ASSEMBLY FOR A PROPULSION SYSTEM" filed on Oct. 23, 2013. All of the above listed applications are herein incorporated by reference.

BACKGROUND OF THE INVENTION

The technology described herein relates to an unducted thrust producing system, particularly a spanwise aerodynamic loading distribution for rotating elements that are paired with stationary elements. The technology is of particular benefit when applied to "open rotor" gas turbine engines.

Gas turbine engines employing an open rotor design architecture are known. A turbofan engine operates on the principle that a central gas turbine core drives a bypass fan, the fan being located at a radial location between a nacelle of the engine and the engine core. An open rotor engine instead operates on the principle of having the bypass fan located outside of the engine nacelle. This permits the use of larger fan blades able to act upon a larger volume of air than for a turbofan engine, and thereby improves propulsive efficiency over conventional engine designs.

Optimum performance has been found with an open rotor design having a fan provided by two contra-rotating rotor assemblies, each rotor assembly carrying an array of airfoil blades located outside the engine nacelle. As used herein, "contra-rotational relationship" means that the blades of the first and second rotor assemblies are arranged to rotate in opposing directions to each other. Typically the blades of the first and second rotor assemblies are arranged to rotate about a common axis in opposing directions, and are axially spaced apart along that axis. For example, the respective blades of the first rotor assembly and second rotor assembly may be co-axially mounted and spaced apart, with the blades of the first rotor assembly configured to rotate clockwise about the axis and the blades of the second rotor assembly configured to rotate counter-clockwise about the axis (or vice versa). In appearance, the fan blades of an open rotor engine resemble the propeller blades of a conventional turboprop engine.

The use of contra-rotating rotor assemblies provides technical challenges in transmitting power from the power turbine to drive the airfoil blades of the respective two rotor assemblies in opposing directions.

It would be desirable to provide an open rotor propulsion system utilizing a single rotating propeller assembly analogous to a traditional bypass fan which reduces the complexity of the design, yet yields a level of propulsive efficiency equal to or better than contra-rotating propulsion design.

BRIEF DESCRIPTION OF THE INVENTION

An unducted thrust producing system has a rotating element with an axis of rotation and a stationary element. The rotating element includes a plurality of blades each having a blade root proximal to the axis, a blade tip remote from the axis, and a blade span measured between the blade root and the blade tip. The rotating element has a load distribution such that at any location between the blade root and 30% span the value of $\Delta RCu$ in the air stream is greater than or equal to 60% of the peak $\Delta RCu$ in the air stream.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 9, 10, 11, 12, 13, 14, 15, 16, 17, 18, and 19 are cross-sectional illustrations of the exemplary airfoil blade of FIG. 8 at section line locations 1 through 11 in comparison with analogous sections through the conventional airfoil blade referenced previously.

DETAILED DESCRIPTION OF THE INVENTION

Figure 1:
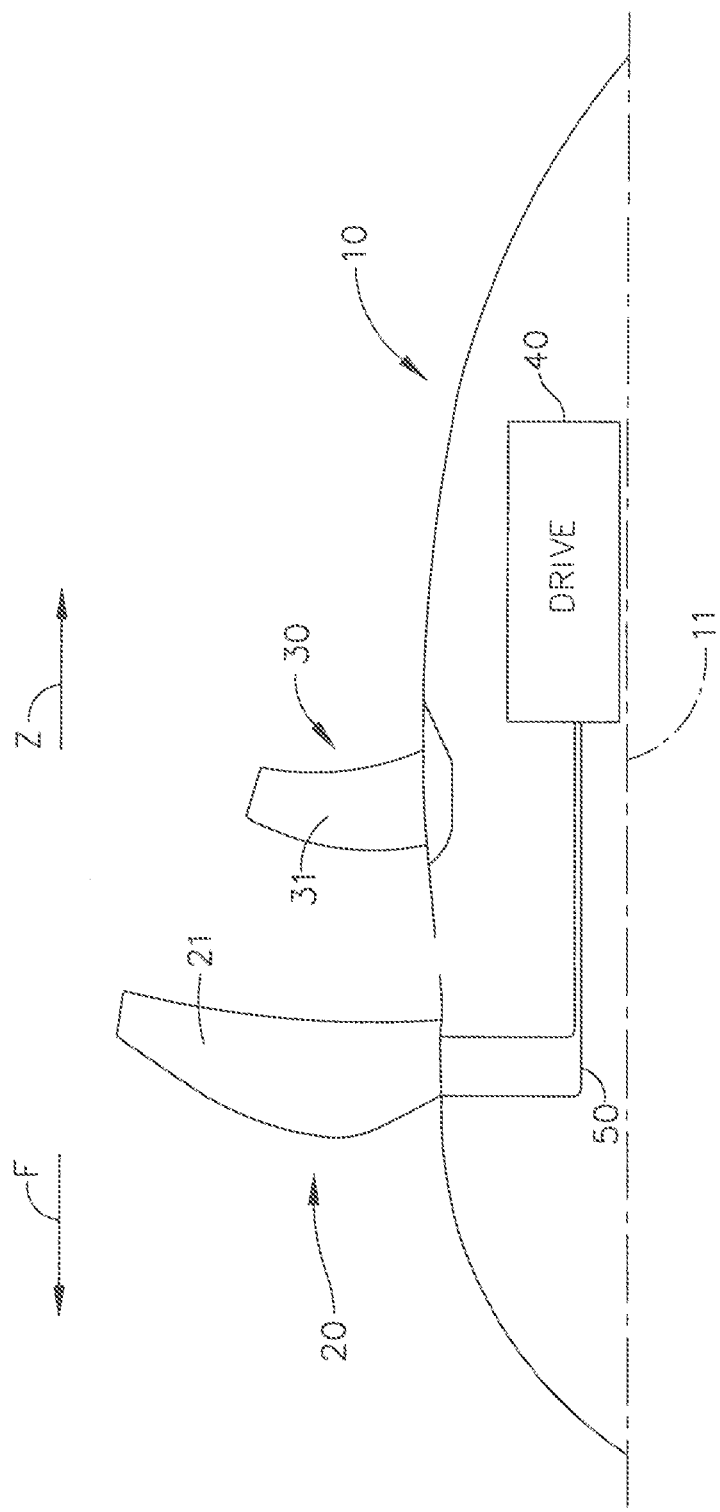
FIG. 1 shows an elevational cross-sectional view of an exemplary unducted thrust producing system.

In all of the Figures which follow, like reference numerals are utilized to refer to like elements throughout the various embodiments depicted in the Figures.

Figure 2:
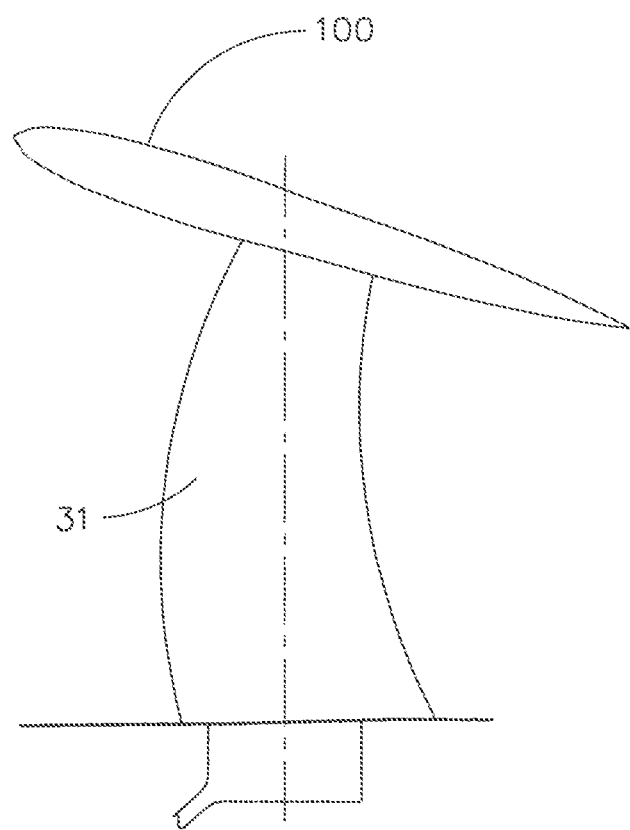
FIG. 2 is an illustration of an alternative embodiment of an exemplary vane assembly for an unducted thrust producing system.

FIG. 1 shows an elevational cross-sectional view of an exemplary unducted thrust producing system 10. As is seen from FIG. 1, the unducted thrust producing system 10 takes the form of an open rotor propulsion system and has a rotating element 20 depicted as a propeller assembly which includes an array of blades 21 around a central longitudinal axis 11 of the unducted thrust producing system 10. Unducted thrust producing system 10 also includes in the exemplary embodiment a non-rotating stationary element 30 which includes an array of vanes 31 also disposed around central axis 11. These vanes may be arranged such that they are not all equidistant from the propeller, and may optionally include an annular shroud or duct 100 distally from axis 11 (as shown in FIG. 2) or may be unshrouded. These vanes are mounted to a stationary frame and do not rotate relative to the central axis 11. For reference purposes, FIG. 1 also depicts a Forward direction denoted with arrow F.

As shown in FIG. 1, the exemplary unducted thrust producing system 10 also includes a drive mechanism 40 which provides torque and power to the rotating element 20 through a transmission 50. In various embodiments, the drive mechanism 40 may be a gas turbine engine, an electric motor, an internal combustion engine, or any other suitable source of torque and power and may be located in proximity to the rotating element 20 or may be remotely located with a suitably configured transmission 50. Transmission 50 transfers power and torque from the drive mechanism 40 to the rotating element 20 and may include one or more shafts, gearboxes, or other mechanical or fluid drive systems.

Airfoil blades 21 of rotating element 20 are sized, shaped, and configured to produce thrust by moving a working fluid such as air in a direction Z as shown in FIG. 1 when the rotating element 20 is rotated in a given direction around the longitudinal axis 11. In doing so, blades 21 impart a degree of swirl to the fluid as it travels in the direction Z. Vanes 31 of the stationary element are sized, shaped, and configured to decrease the swirl magnitude of the fluid, so as to increase the kinetic energy that generates thrust for a given shaft power input to the rotating element. For both blades and vanes, span is defined as the distance between root and tip. Vanes 31 may have a shorter span than blades 21, as shown in FIG. 1, for example, 50% of the span of blades 21, or may have longer span or the same span as blades 21 as desired. Vanes 31 may be attached to an aircraft structure associated with the propulsion system, as shown in FIG. 1, or another aircraft structure such as a wing, pylon, or fuselage. Vanes 31 of the stationary element may be fewer or greater in number than, or the same in number as, the number of blades 21 of the rotating element and typically greater than two, or greater than four, in number.

Vanes 31 of the stationary element 30 may be positioned aerodynamically upstream of the blades 21 so as to serve as counter swirl vanes, i.e., imparting a tangential velocity which is opposite to the rotation direction of the rotating element 20. Alternatively, and as shown in FIG. 1, vanes 31 may be positioned aerodynamically downstream of the blades 21 so as to serve as de-swirl vanes, i.e., imparting a change in tangential velocity which is counter to that of the rotating element 20. Any swirl remaining in the airstream downstream of the propulsion system 10 equates to a loss in thrust producing kinetic energy.

It may be desirable that either or both of the sets of blades 21 and vanes 31 incorporate a pitch change mechanism such that the blades and vanes can be rotated with respect to an axis of pitch rotation either independently or in conjunction with one another. Such pitch change can be utilized to vary thrust and/or swirl effects under various operating conditions, including to provide a thrust reversing feature which may be useful in certain operating conditions such as upon landing an aircraft.

Figure 3:
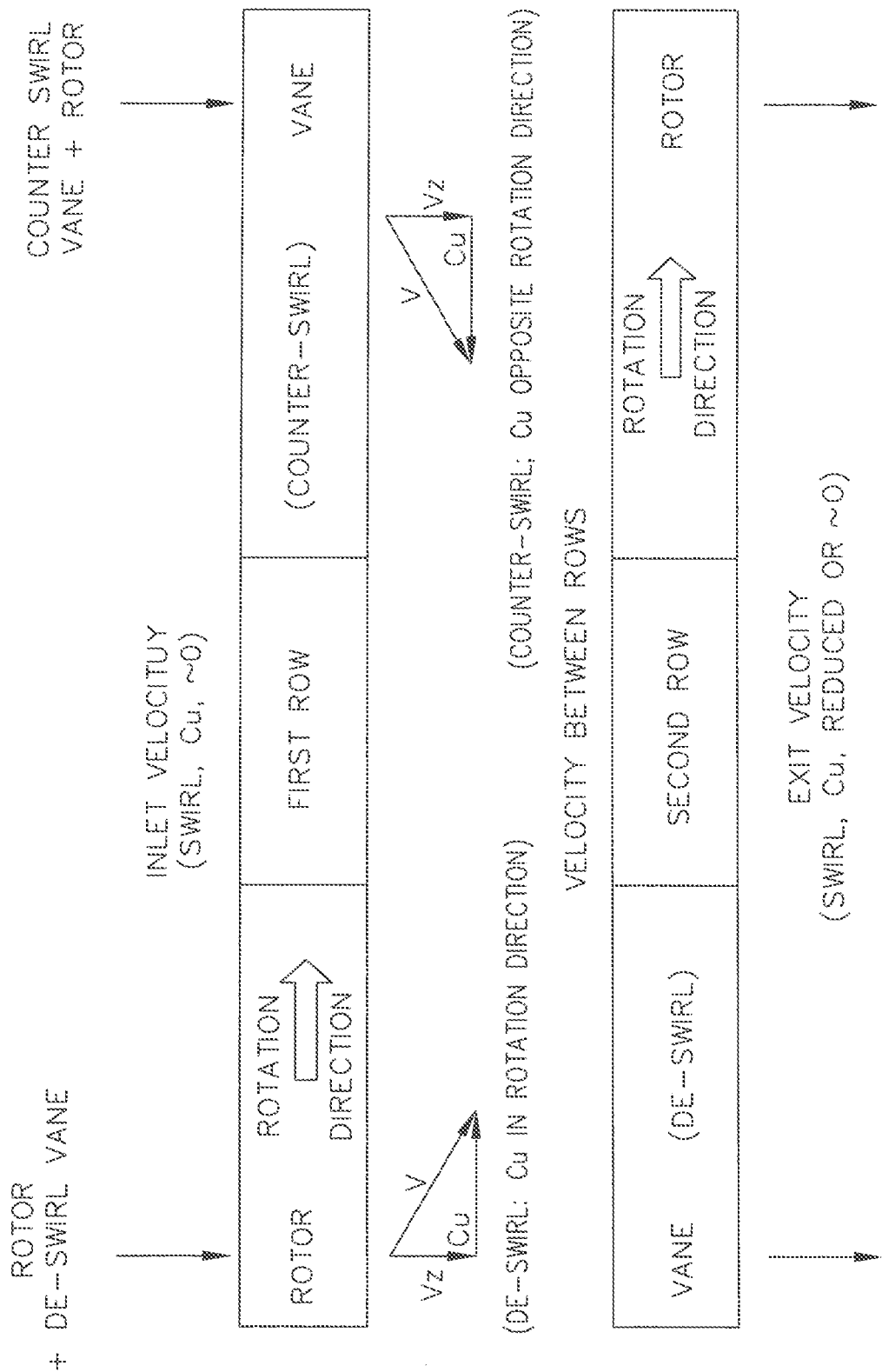
FIG. 3 depicts vector diagrams illustrating Cu through both rows for two exemplary embodiments.

FIG. 3 depicts the change in Cu across the rotating and stationary elements, where Cu is the circumferential averaged tangential velocity. Vector diagrams are shown in a coordinate system in which the axial direction is in the downward direction and tangential direction is left to right. Multiplying the Cu times the airstream radius R gives the property RCu. The blade or vane loading at a given radius R is now defined as the change in RCu across the blade row (at a constant radius or along a streamtube), here forth referred to as ΔRCu and is a measure of the elemental specific torque of said blade row. Desirably, the ΔRCu for the rotating element should be in the direction of rotation throughout the span.

Figure 4:
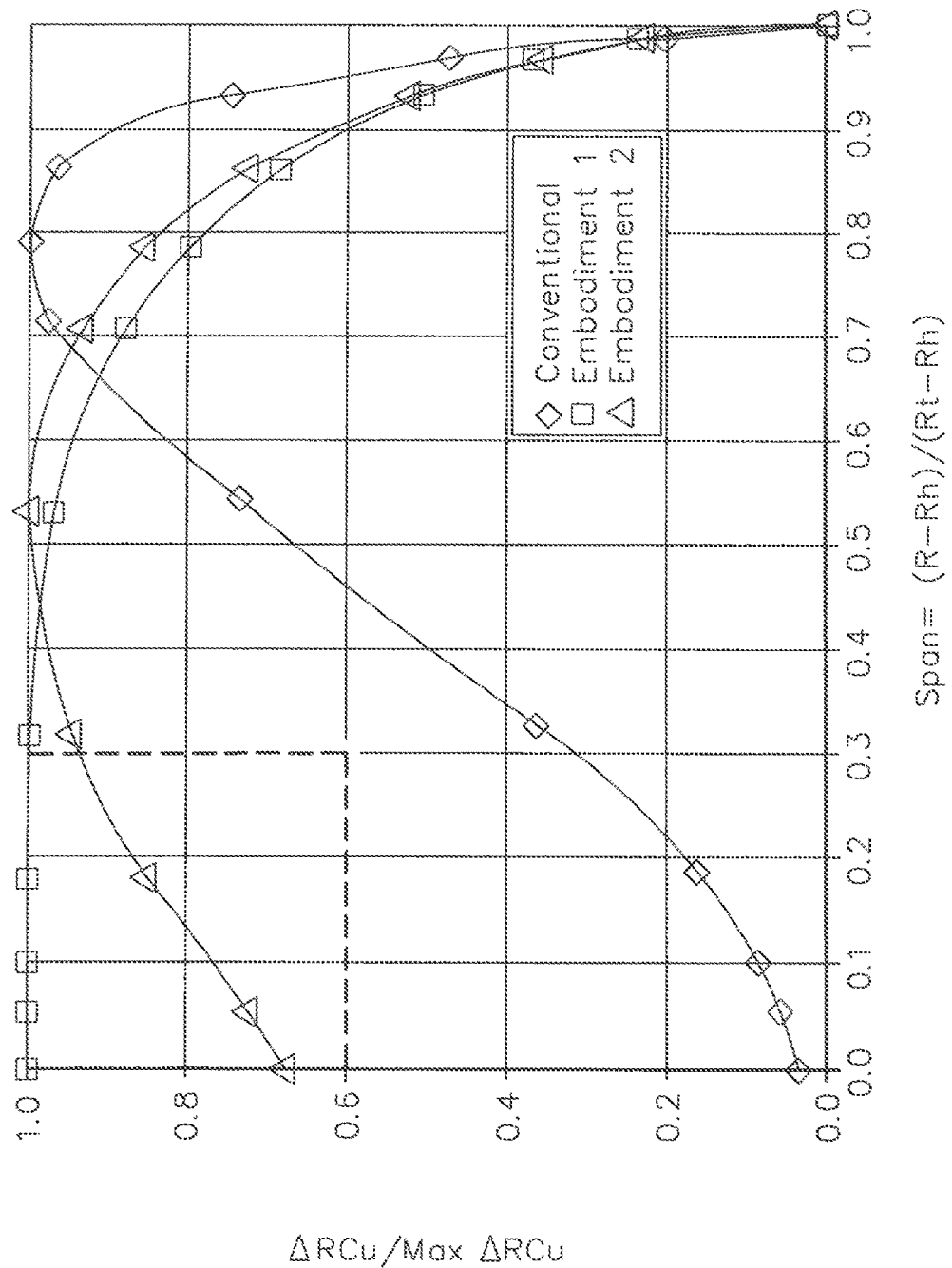
FIG. 4 depicts graphically the aerodynamic rotor load distribution of two exemplary embodiments of an unducted thrust producing system in comparison with a conventional configuration.

FIG. 4 is a graphical depiction of the aerodynamic load distribution vs. span of the rotating element 20 of the exemplary unducted thrust producing system 10. FIG. 4 illustrates three curves. The curve with the diamonds is a loading distribution for a conventional propeller assembly optimized for minimum wasted/unused kinetic energy for a single rotation propeller with no de-swirl system. The curves with the squares and triangles are a loading distributions for exemplary embodiments of the unducted thrust producing system 10 described herein. As shown in FIG. 4, both curves for the exemplary embodiment have a more uniform ΔRCu over the span, particularly in the region between the blade root and midspan. In fact, at a location of 30% span the value of ΔRCu is greater than or equal to 60% of the maximum value of ΔRCu, and, in an embodiment, is greater than or equal to 70% of the maximum value of ΔRCu, and, in an embodiment, is greater than or equal to 80% of the maximum value of ΔRCu. ΔRCu is measured across the rotating element (propeller blade row) in a conventional manner. Blades 21 are sized, shaped, and configured to deliver this loading distribution using techniques known to those of ordinary skill in the art.

Exemplary embodiments described herein demonstrate a particular distribution of ΔRCu across the blade of a rotating element or propeller assembly including a stationary element comprised of either de-swirl vanes or upstream counter-swirl vanes. In the design process this ΔRCu will be used in conjunction with the aircraft flight velocity, the rotational speed of the rotor, and the overall thrust required from the assembly to define the vector diagrams of the air.

Figure 5:
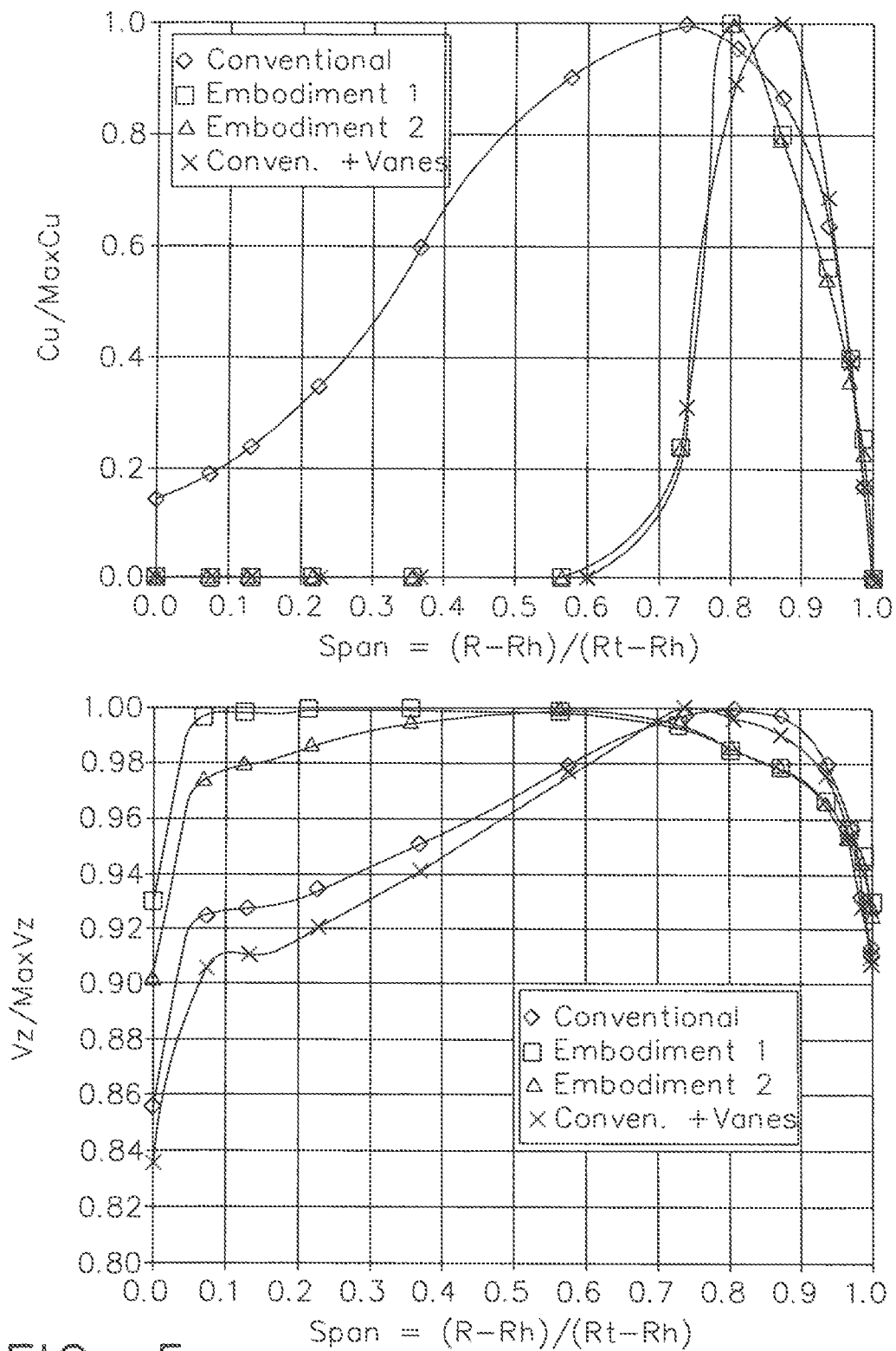
FIG. 5 depicts graphically the exit swirl velocity and axial velocity for two exemplary embodiments of an unducted thrust producing system in comparison with two conventional configurations.

FIG. 5 depicts swirl, Cu, and axial velocity, Vz, at the exit of the unducted thrust producing system. FIG. 5 illustrates four curves. The curves with the diamonds and "x" symbols are for two conventional configurations, rotor only and conventional rotor with de-swirl vanes, respectively. The curves with squares and triangles are for two exemplary embodiments described herein. Compared to the conventional configurations, the embodiments have less exit swirl and more uniform axial velocity, indicating lower wasted kinetic energy in the exit stream and more energy converted into useful thrust.

Figure 6:
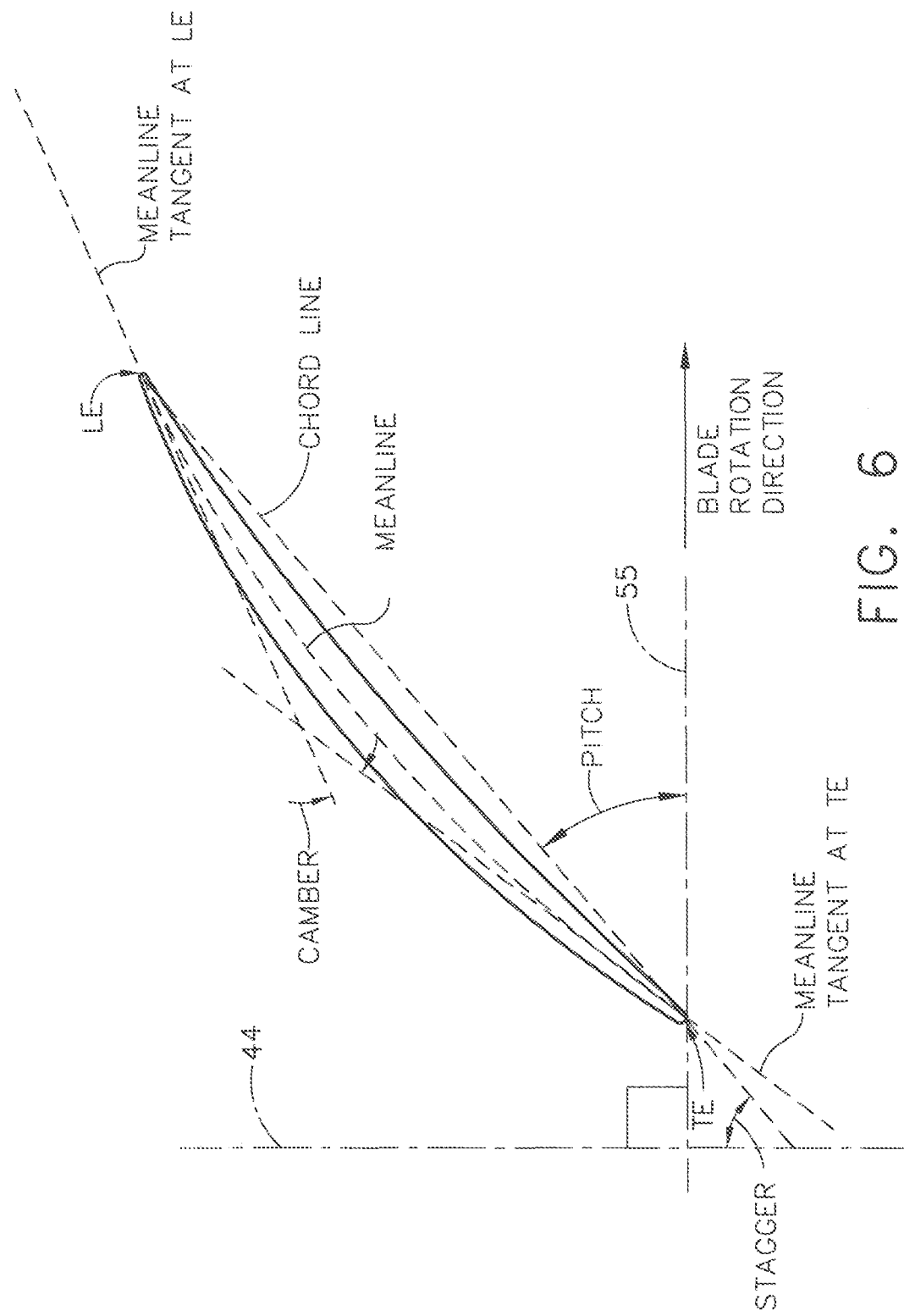
FIG. 6 depicts graphically how various parameters such as camber and stagger angle are defined with respect to a blade or vane.

FIG. 6 depicts graphically how various parameters such as camber and stagger angle are defined with respect to a blade or vane. An airfoil meanline is a described as a line that bisects the airfoil thickness (or is equidistant from the suction surface and pressure surface) at all locations. The meanline intersects the airfoil at leading edge and trailing edge. The camber of an airfoil is defined as the angle change between the tangent to the airfoil meanline at the leading edge and the tangent to the angle meanline at the trailing edge. The stagger angle is defined as the angle the chord line makes with the centreline axis. Reference line 44 is parallel to axis 11, and reference line 55 is orthogonal to reference line 44.

In addition to the noise reduction benefit the duct 100 shown in FIG. 2 provides a benefit for vibratory response and structural integrity of the stationary vanes 31 by coupling them into an assembly forming an annular ring or one or more circumferential sectors, i.e., segments forming portions of an annular ring linking two or more vanes 31 such as pairs forming doublets. The duct 100 may allow the pitch of the vanes to be varied as desired.

A significant, perhaps even dominant, portion of the noise generated by the disclosed fan concept is associated with the interaction between wakes and turbulent flow generated by the upstream blade-row and its acceleration and impingement on the downstream blade-row surfaces. By introducing a partial duct acting as a shroud over the stationary vanes, the noise generated at the vane surface can be shielded to effectively create a shadow zone in the far field thereby reducing overall annoyance. As the duct is increased in axial length, the efficiency of acoustic radiation through the duct is further affected by the phenomenon of acoustic cut-off, which can be employed, as it is for conventional aircraft engines, to limit the sound radiating into the far-field. Furthermore, the introduction of the shroud allows for the opportunity to integrate acoustic treatment as it is currently done for conventional aircraft engines to attenuate sound as it reflects or otherwise interacts with the liner. By introducing acoustically treated surfaces on both the interior side of the shroud and the hub surfaces upstream and downstream of the stationary vanes, multiple reflections of acoustic waves emanating from the stationary vanes can be substantially attenuated.

Figure 7:
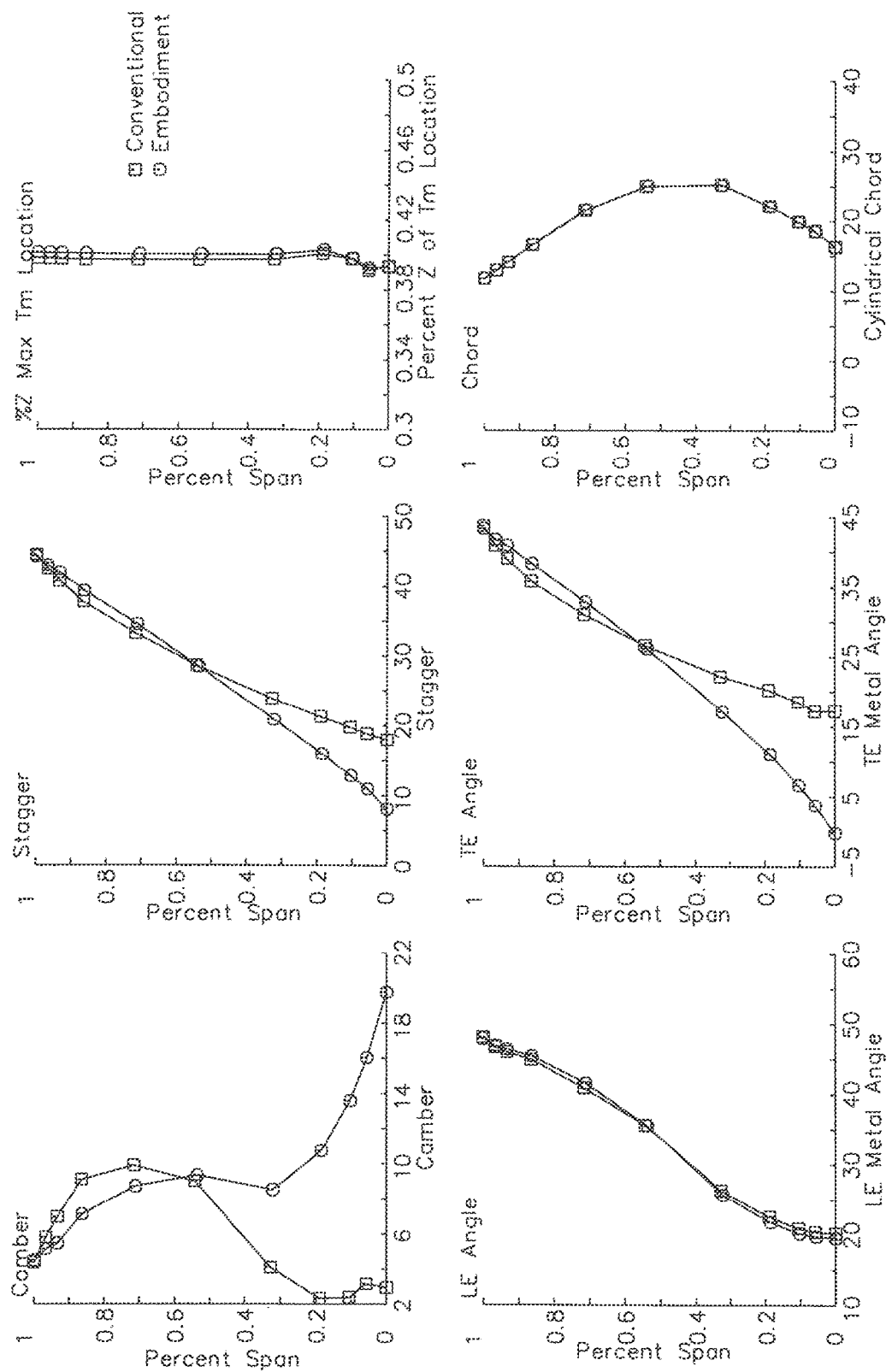
FIG. 7 depicts graphically representative parameters associated with an exemplary embodiment of an airfoil blade in comparison with a conventional airfoil blade.

Following a design process blade geometries will be defined that create the desired vector diagrams as illustrated in FIG. 3. While the fundamental desired characteristic is a torque distribution, this will result in a blade geometry designed to achieve the desired torque distribution. An illustration of the change in geometry required to produce the desired torque characteristic, when compared to that currently optimum for a single rotation propeller without de-swirl vane, is shown in FIG. 7. It can be seen that this leads to a change in the blade cambers in the inner portion of the blade, i.e., from about 0 to approximately 50% span, and it is expected that characteristics of exemplary embodiments could also be loosely defined by a camber distribution. At least one of the following criteria are met: at 30% span the blade camber is at least 90% of the max camber level between 50% and 100% span; and the 0% span camber is at least 110% of the max camber between 50% and 100% span.

Figure 8:
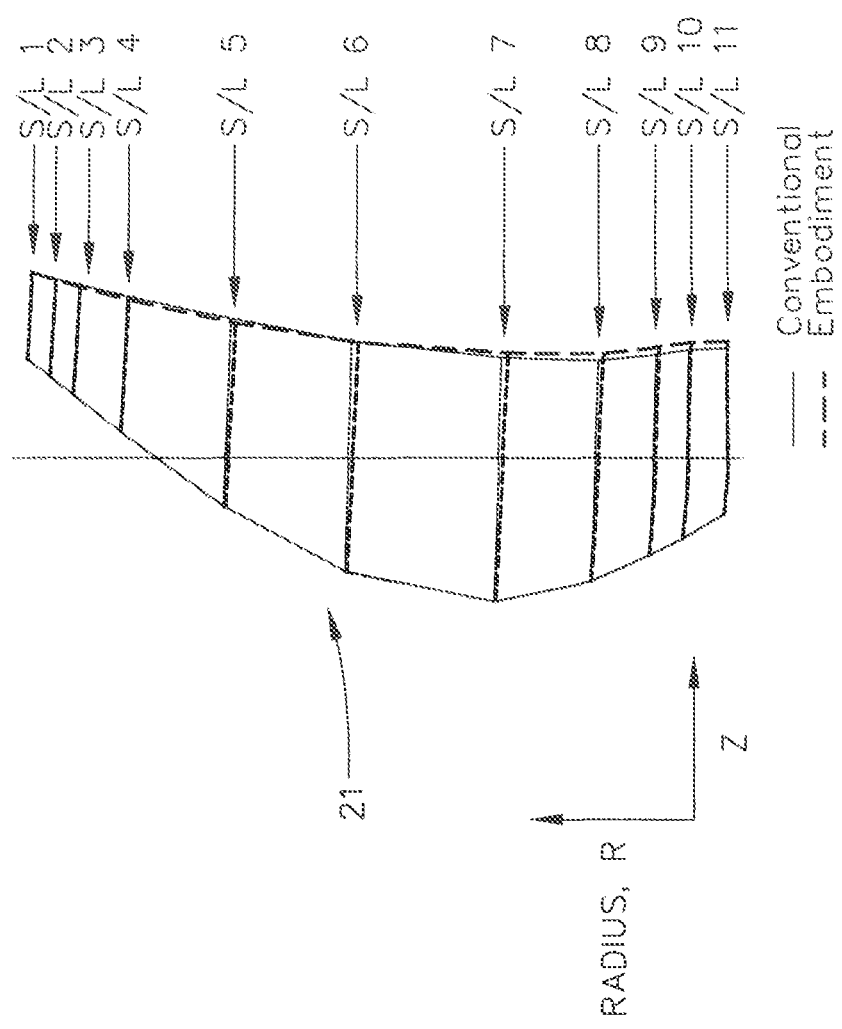
FIG. 8 is an elevational view of an exemplary airfoil blade for an unducted thrust producing system with section line locations 1 through 11 identified.
Figure 9:
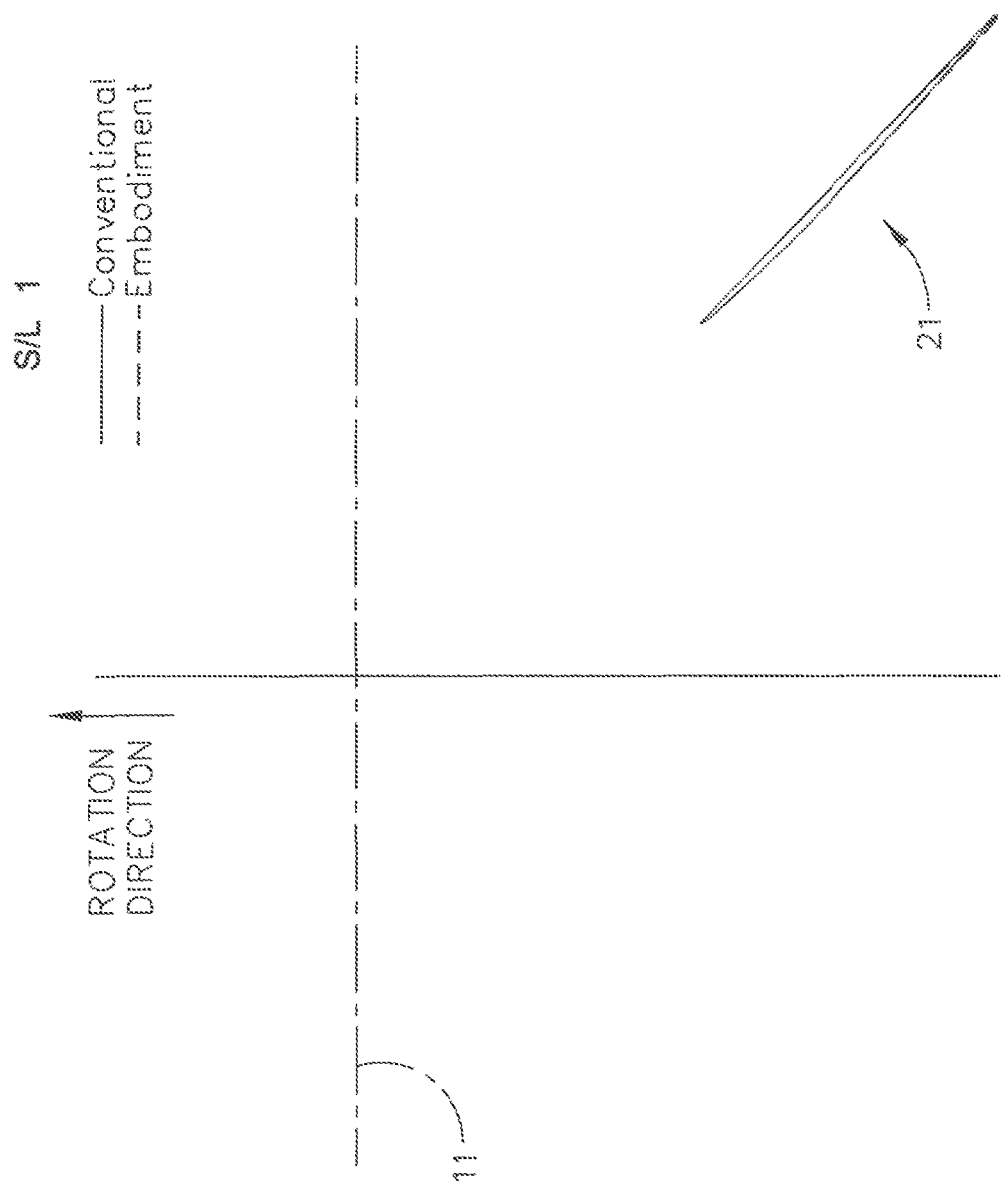
Figure 10:
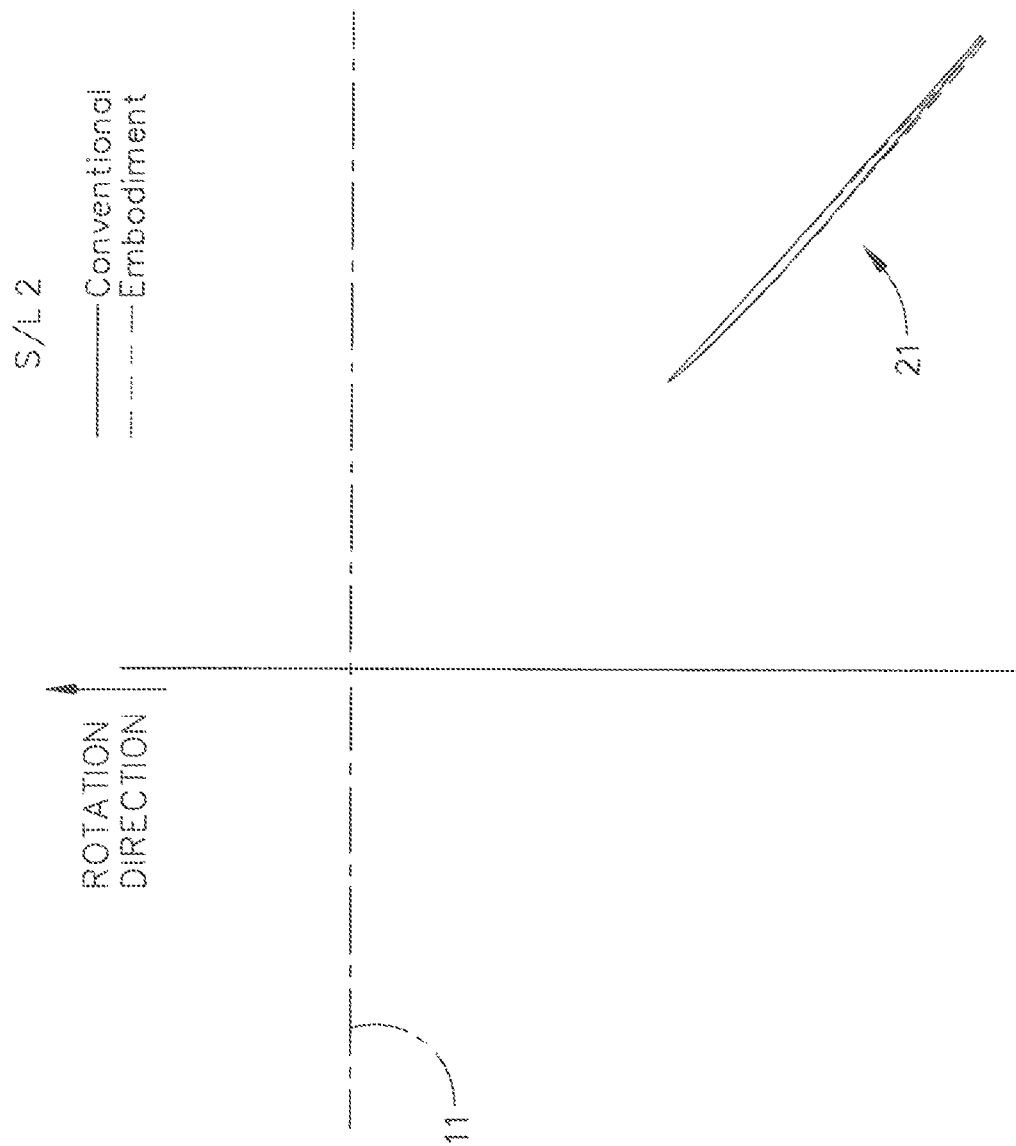
Figure 11:
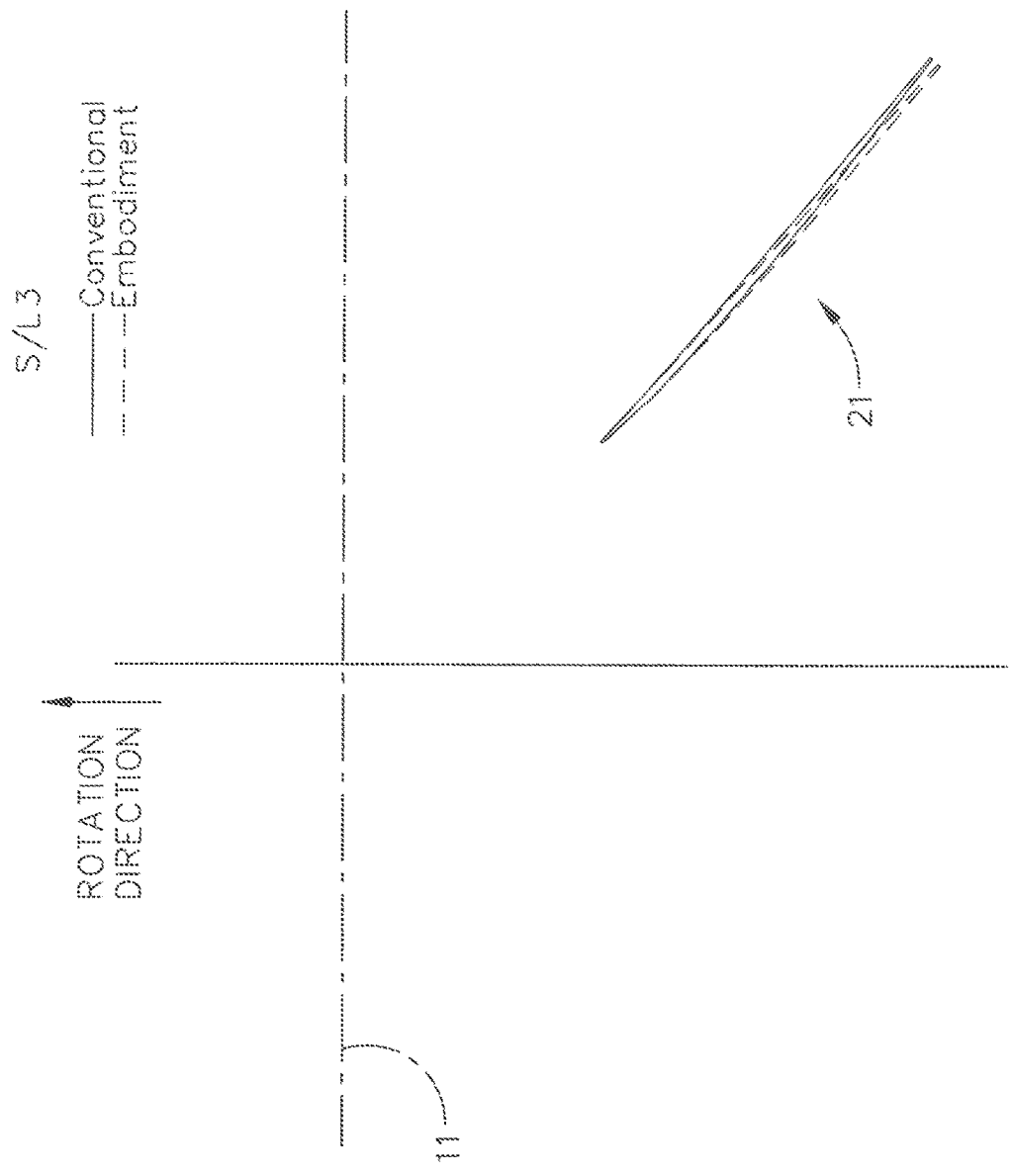
Figure 12:
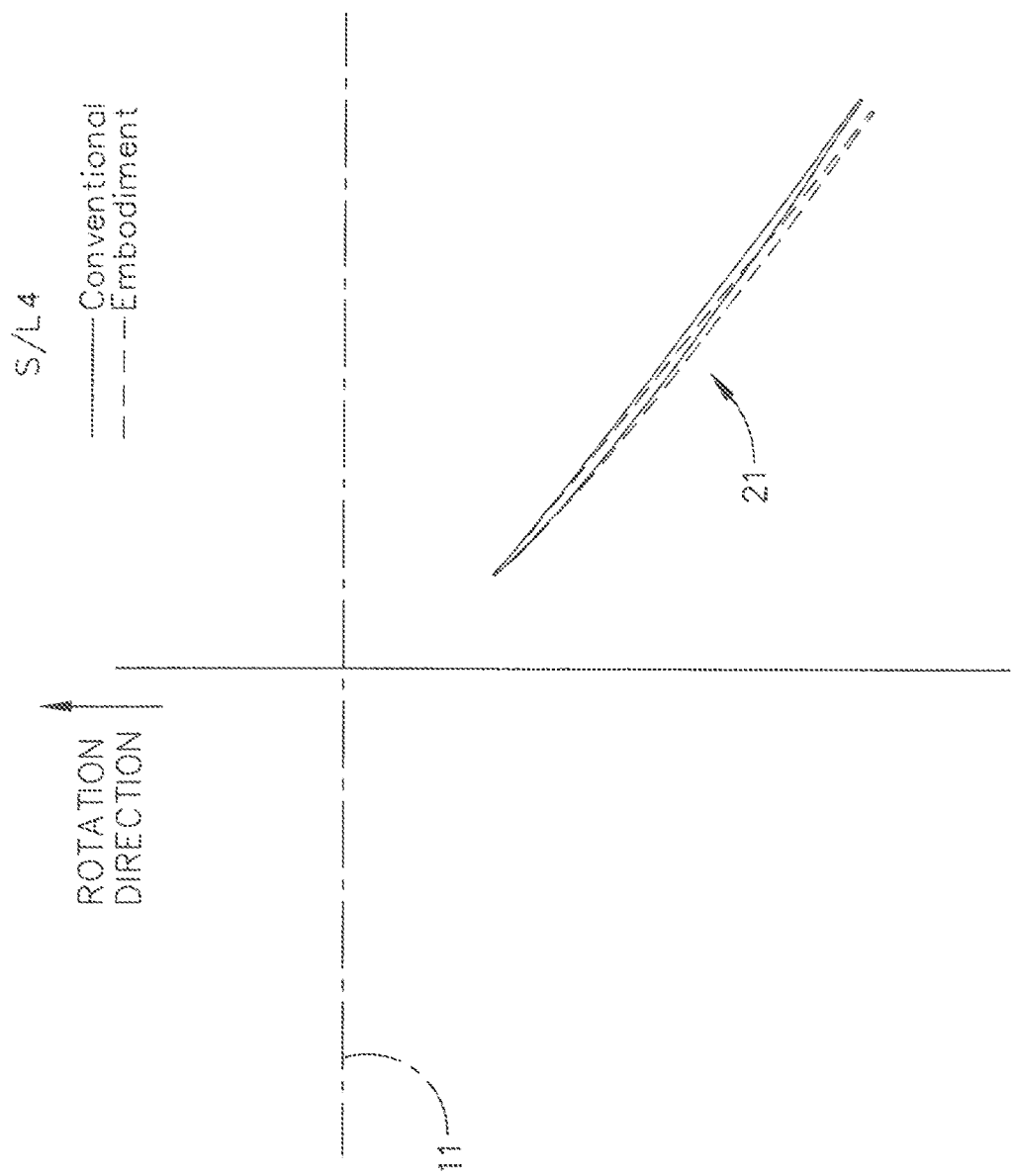
Figure 13:
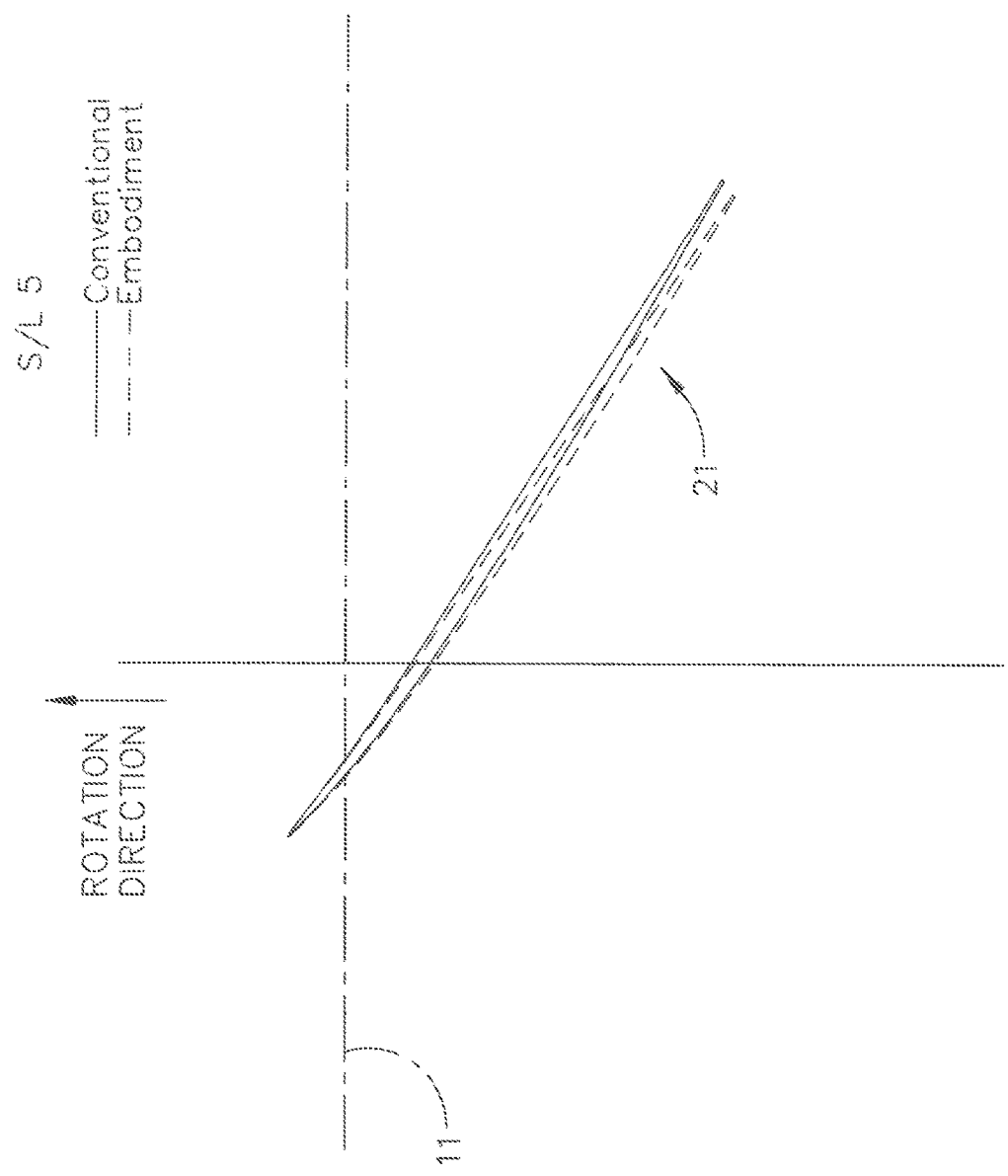
Figure 14:
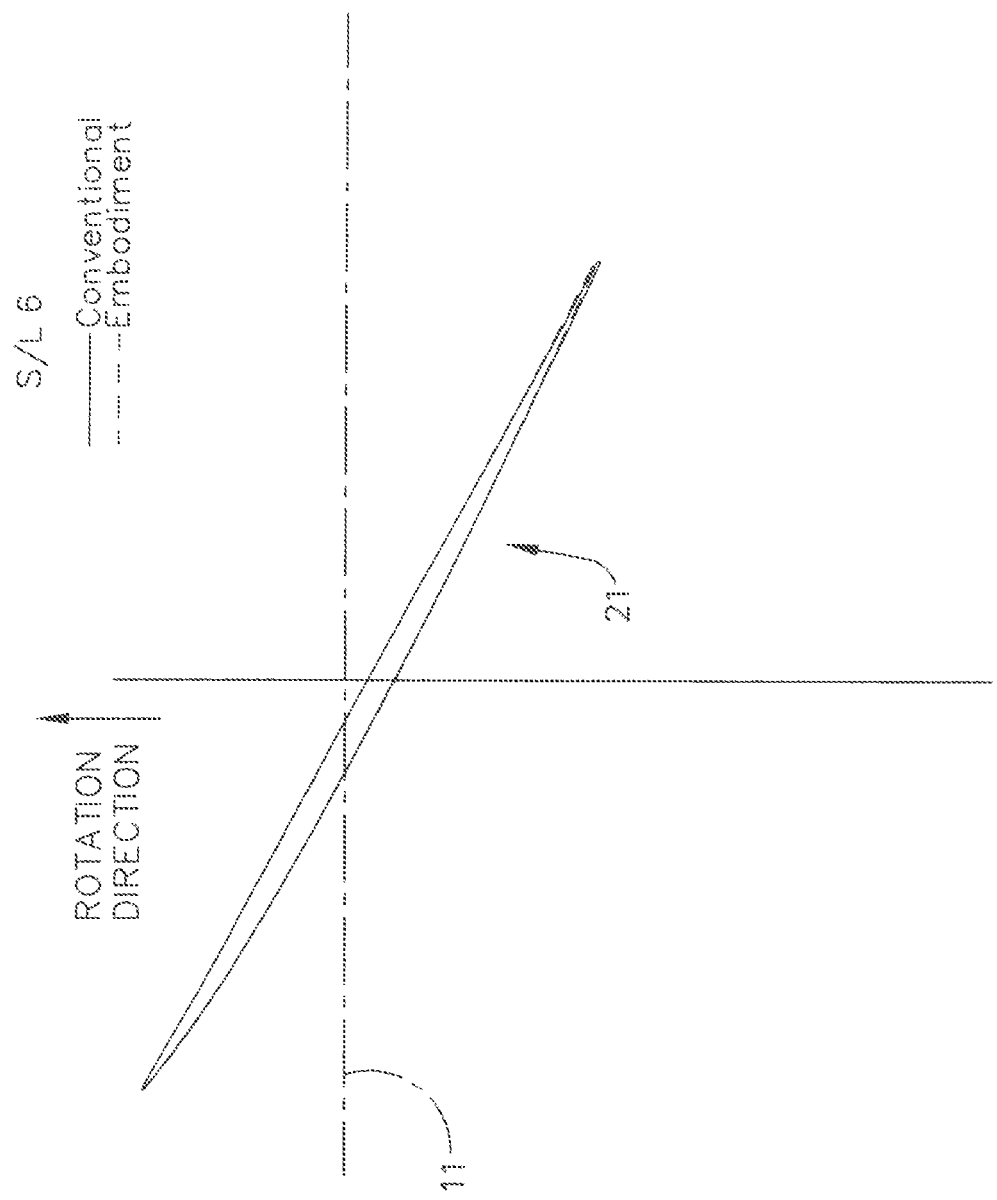
Figure 15:
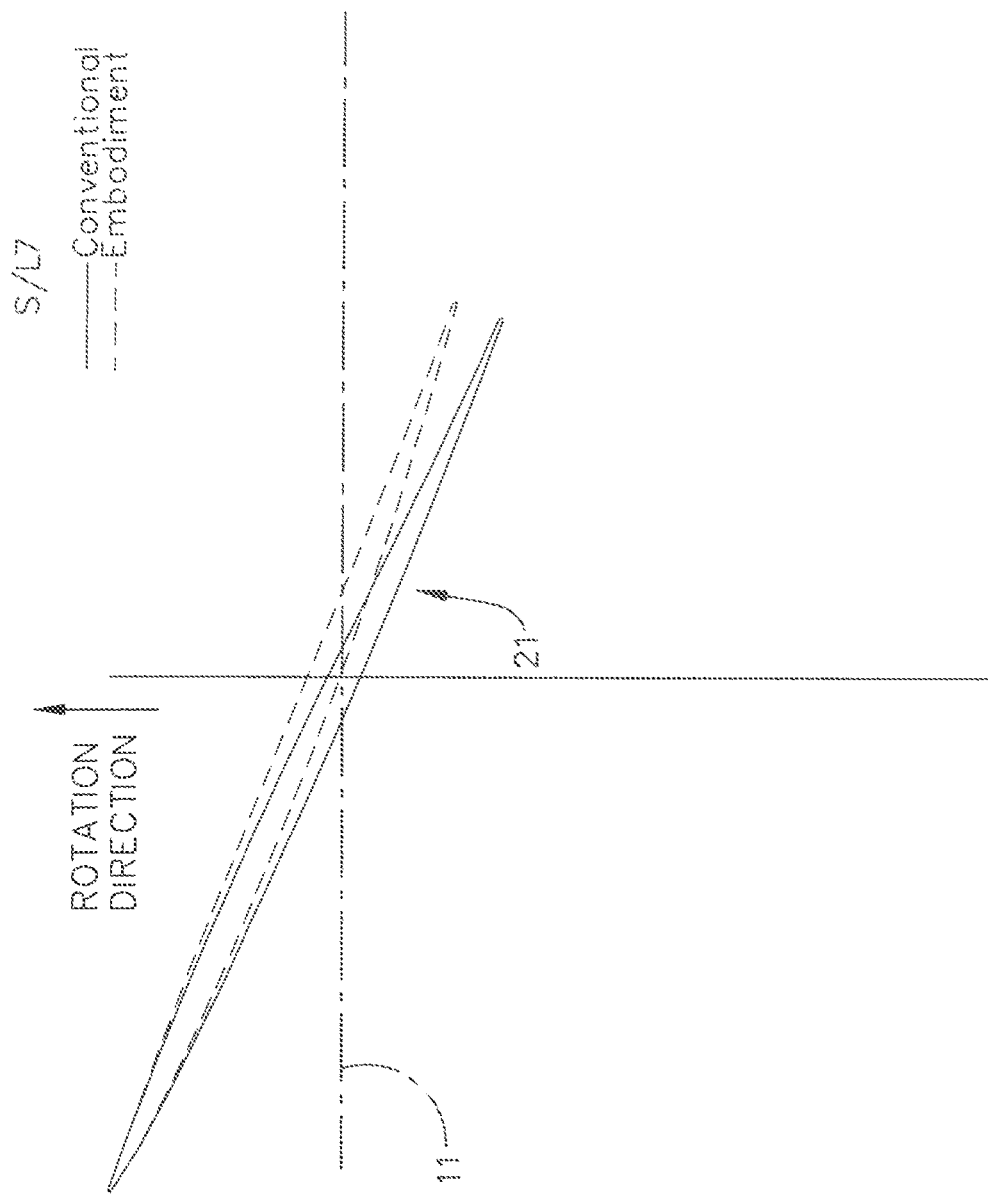
Figure 16:
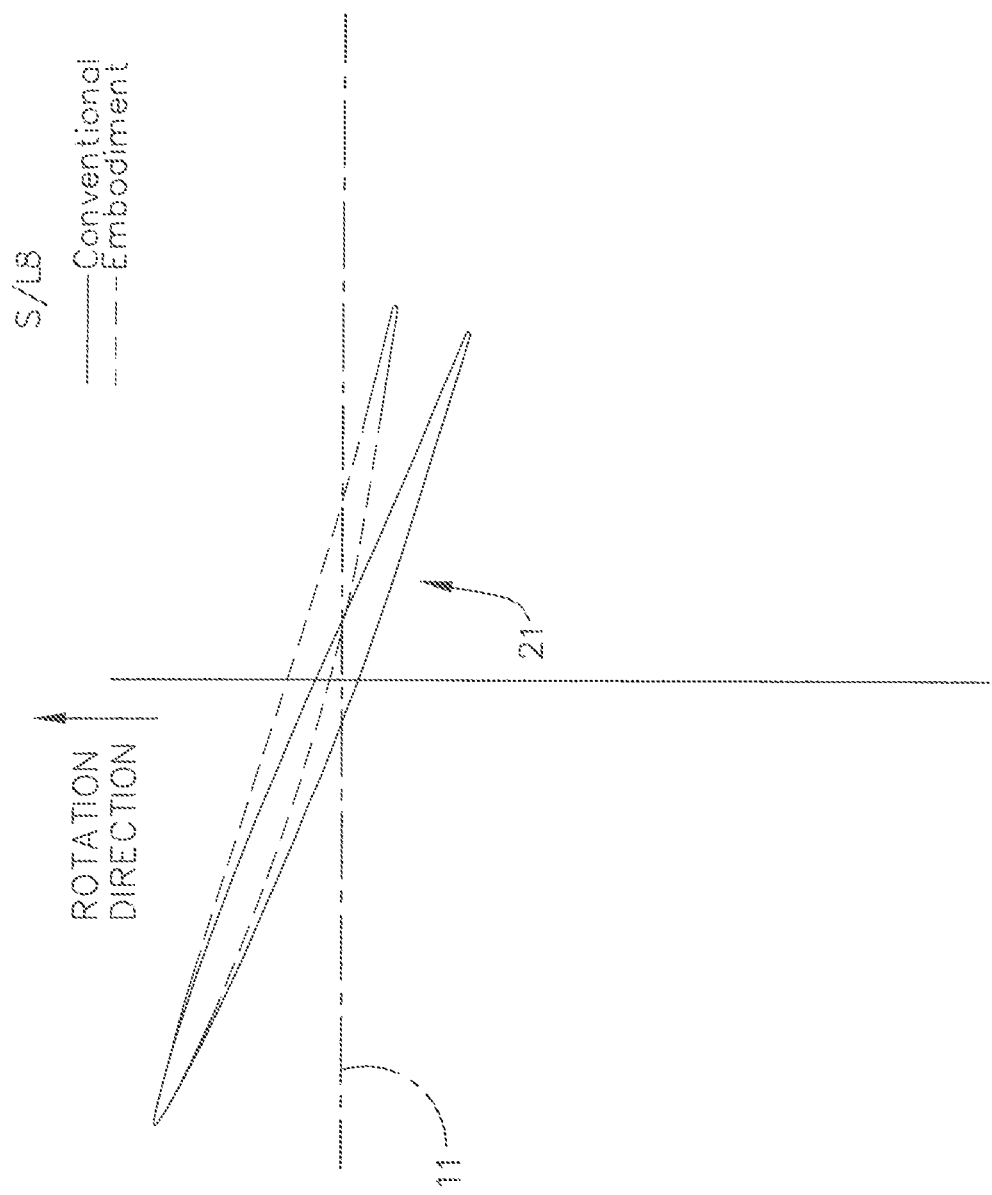
Figure 17:
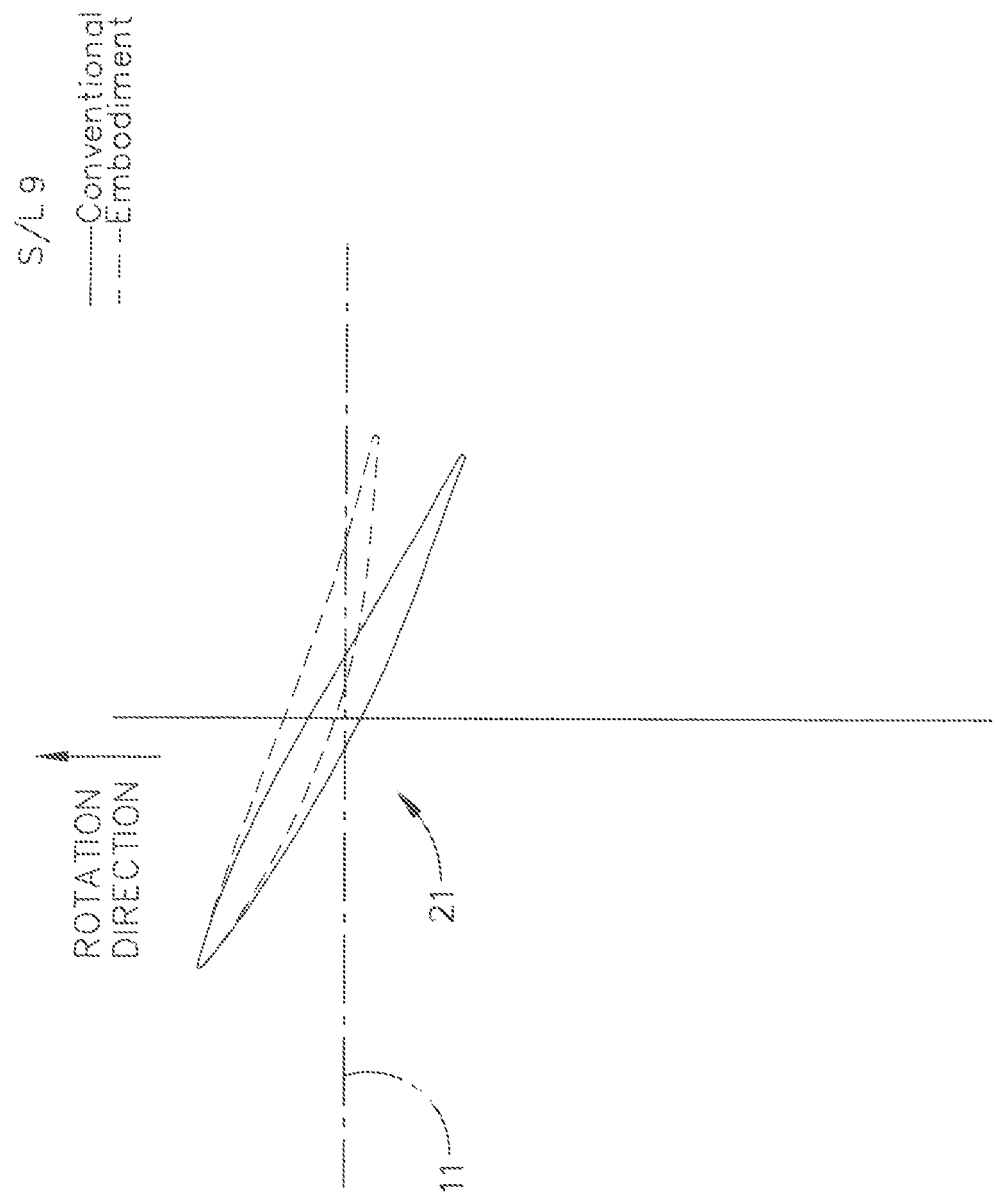
Figure 18:
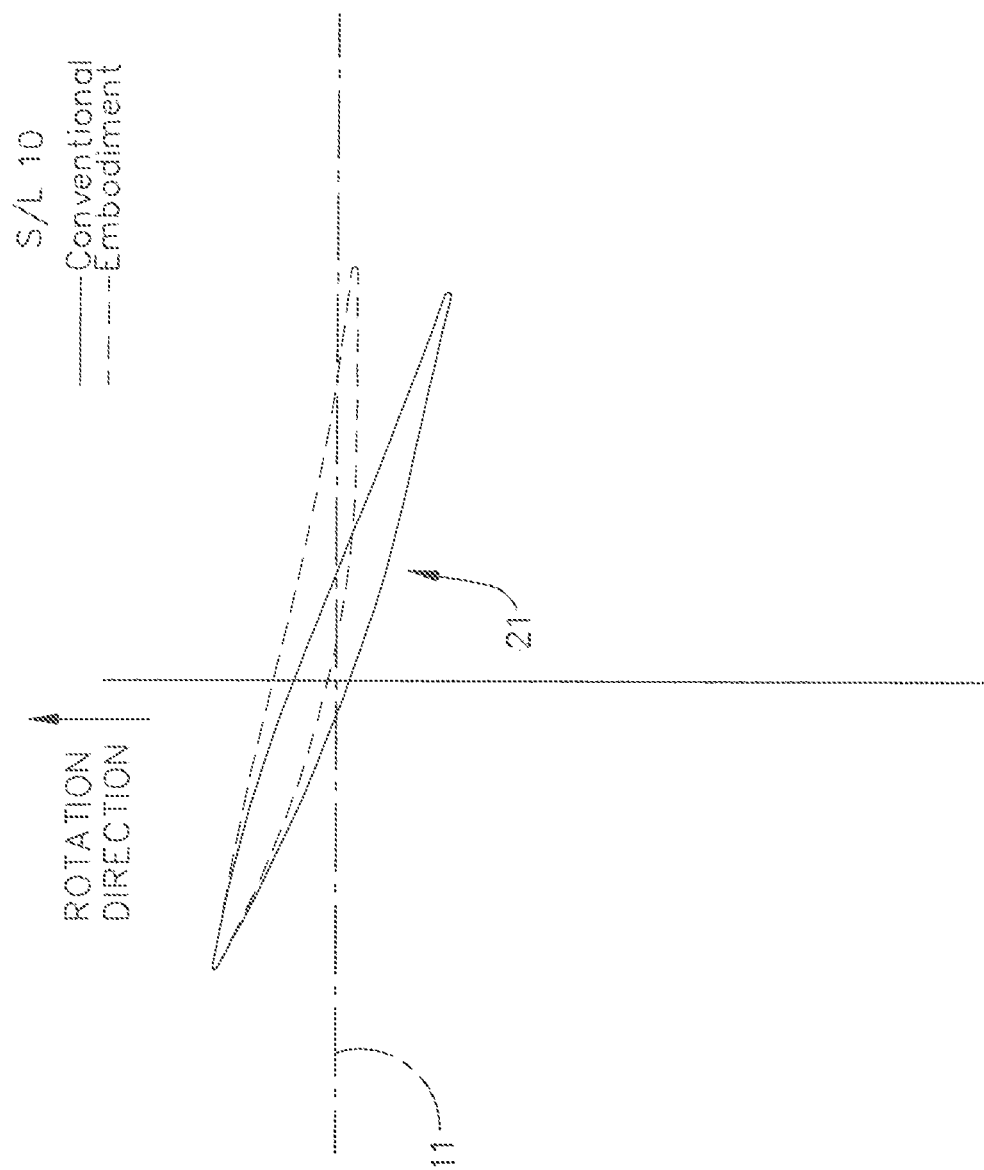

FIG. 8 is an elevational view of an exemplary airfoil blade 21, such as depicted in FIG. 1 for use with an unducted thrust producing system as described herein, with section line locations 1 through 11 identified with section 1 being the blade tip and section 11 being the blade root. The blade span is measured between the root and the tip. FIGS. 9 through 19 sequentially illustrate airfoil blade cross-sections at section line locations 1 through 11 for both an exemplary airfoil blade 21 and analogous sections through the conventional airfoil blade referenced previously. As shown in the sequence of illustrations, the two airfoil blades have cross-sections which are increasingly different in size, shape, and orientation in the direction from section 1 to section 11, i.e., from tip to root. Said differently, the region of greatest difference between the exemplary airfoil blade and the conventional airfoil blade is near the hub consistent with the largest difference in loading distribution.

It may be desirable to utilize the technologies described herein in combination with those described in the above referenced related applications.

In addition to configurations suited for use with a conventional aircraft platform intended for horizontal flight, the technology described herein could also be employed for helicopter and tilt rotor applications and other lifting devices, as well as hovering devices.

Other potential configurations include those designed to extract energy from an air stream and produce useful torque, such as windmills which utilize torque generated by extracting energy from the air moving past their location to drive generators and produce electricity. Such configurations may include upstream counter swirl vanes.

The technology described herein is particularly beneficial for aircraft that cruise with shaft power per unit annulus area of above 20 SHP/ft$^2$ (shaft horsepower per square foot) where the swirl losses can become significant. Loadings of 20 SHP/ft$^2$ and above permit aircraft to cruise at Mach numbers above 0.6 Mach number without requiring excessively large propeller areas to limit swirl losses. One of the major benefits of embodiments of the invention is its ability to achieve high shaft power per unit annulus area without significant swirl loss penalties and this opens the opportunity to cruise at Mach numbers of 0.8 and above.

The exemplary embodiment discloses a propeller assembly for a propulsion system. The propeller assembly comprises a plurality of propeller blades each having a blade root proximal to an axis of rotation, a blade tip remote from the axis, and a blade span measured between the blade root and the blade tip. The propeller assembly has a load distribution such that at any location between the blade root and 30% span the value of $\Delta RCu$ is greater than or equal to 60% of the peak $\Delta RCu$, and, in an embodiment, at 30% span the value of $\Delta RCu$ is greater than or equal to 70% of the peak $\Delta RCu$.

The foregoing description of the embodiments of the invention is provided for illustrative purposes only and is not intended to limit the scope of the invention as defined in the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An unducted thrust producing system for a design operating condition including flight speed, rotational speed, and thrust, comprising:
   a stationary element; and
   a rotating element comprising:
      an axis of rotation; and
      a plurality of blades, each of said plurality of blades comprising:
         a blade root proximal to said axis;
         a blade tip remote from said axis; and
         a blade span measured between said blade root and said blade tip,
   wherein said rotating element at said design operating condition has a load distribution such that at any location between said blade root and 30% span the value of $\Delta RCu$ is greater than or equal to 70% of the peak $\Delta RCu$.

2. The unducted thrust producing system of claim 1, wherein said rotating element has a load distribution such that at any location between said blade root and 30% span the value of $\Delta RCu$ in the air stream is greater than or equal to 80% of the peak $\Delta RCu$ in the air stream.

3. The unducted thrust producing system of claim 1, wherein said unducted thrust producing system is a propeller system.

4. The unducted thrust producing system of claim 1, wherein said unducted thrust producing system is an open rotor system.

5. The unducted thrust producing system of claim 1, wherein said stationary element comprises a plurality of vanes each comprising a vane root proximal to said axis, a vane tip remote from said axis, and a vane span measured between said vane root and said vane tip configured to impart a change in tangential velocity of the air opposite to that imparted by said rotating element.

6. The unducted thrust producing system of claim 5, wherein said vanes are positioned upstream of said rotating element.

7. The unducted thrust producing system of claim 5, wherein said vanes are positioned downstream of said rotating element.

8. The unducted thrust producing system of claim 5, wherein said vanes are variable in pitch.

9. The unducted thrust producing system of claim 5, wherein at least one of said vanes comprise a shroud distally from said axis.

10. The unducted thrust producing system of claim 5, wherein the Cu in the air stream aft of said unducted thrust producing system is relatively low compared to ΔCu of said rotating element over the majority of the span of said vanes.

11. The unducted thrust producing system of claim 5, wherein at least one of said vanes is attached to an aircraft structure.

12. The unducted thrust producing system of claim 5, wherein said stationary element comprises more than two of said plurality of vanes.

13. The unducted thrust producing system of claim 12, wherein said stationary element comprises more than four of said plurality of vanes.

14. The unducted thrust producing system of claim 1, wherein said unducted thrust producing system is a tilt rotor system.

15. The unducted thrust producing system of claim 1, wherein said unducted thrust producing system is a helicopter lift system.

16. The unducted thrust producing system of claim 1, wherein said rotating element is driven via a torque producing device.

17. The unducted thrust producing system of claim 16, wherein said torque producing device is selected from the group consisting of electric motors, gas turbines, gear drive systems, hydraulic motors, and combinations thereof.

18. The unducted thrust producing system of claim 1, wherein said rotating element has a shaft power per unit annulus area greater than about 20 SHP/ft2 at cruise operating conditions.

19. The unducted thrust producing system of claim 1, wherein said blades are variable in pitch.

20. An unducted torque producing system for extracting energy from an air stream for a design operating condition including air stream velocity, rotational speed, and energy extraction, said unducted torque producing system comprising:
   a stationary element; and
   a rotating element comprising:
      an axis of rotation; and
      a plurality of blades, each of said plurality of blades comprising:
         a blade root proximal to said axis;
         a blade tip remote from said axis; and
         a blade span measured between said blade root and said blade tip,
      wherein said rotating element at said design operating condition has a load distribution such that at any location between said blade root and 30% span the value of ΔRCu is greater than or equal to 70% of the peak ΔRCu.

21. The unducted torque producing system of claim 20, wherein said unducted torque producing system is a wind turbine.

22. The unducted torque producing system of claim 20, wherein said stationary element comprises a plurality of vanes each comprising a vane root proximal to said axis, a vane tip remote from said axis, and a vane span measured between said vane root and said vane tip configured to impart a change in tangential velocity of the air opposite to that imparted by said rotating element.

23. The unducted torque producing system of claim 22, wherein said vanes are positioned upstream of said rotating element.

24. The unducted torque producing system of claim 22, wherein said vanes are positioned downstream of said rotating element.

* * * * *